2,481,371

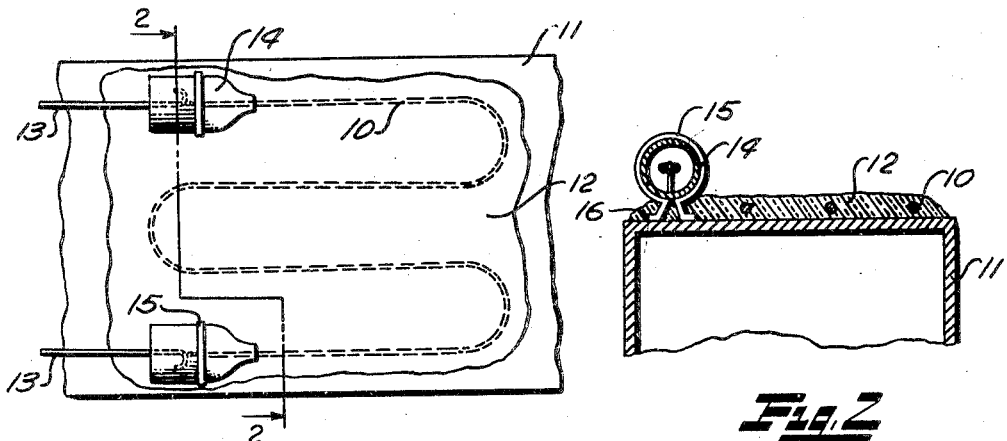
Fig. 1
Fig. 2
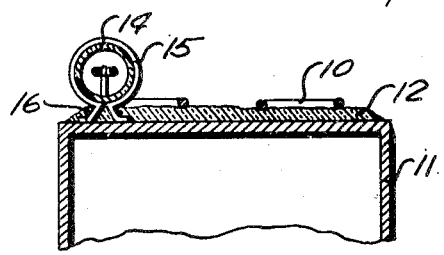
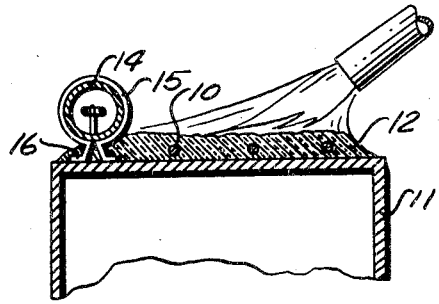
Fig. 3
Fig. 4
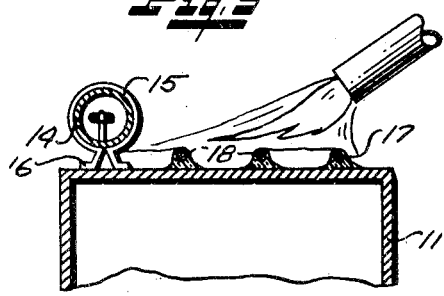
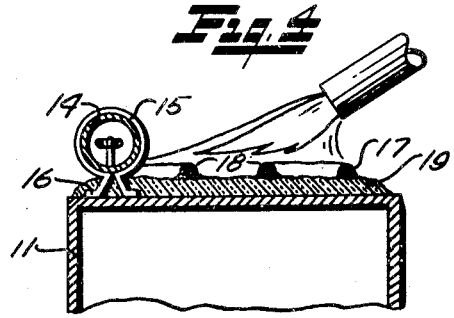
Fig. 5
Fig. 6
INVENTOR.
WILLIAM D. VAN DYKE
BY Edwin Coates
ATTORNEY Patented Sept. 6, 1949

UNITED STATES PATENT OFFICE 2,481,371

HIGH-TEMPERATURE STRAIN GAUGE AND METHOD OF MAKING SAME

William D. Van Dyke, Lawndale, Calif., assignor to Douglas Aircraft Company, Inc., Santa Monica, Calif.

Application July 25, 1945, Serial No. 607,032

4 Claims. (Cl. 201—63)

My invention relates to instruments for measuring strain effects in parts heated in use to temperatures so high that strain gauges of usual construction cannot be used for the reason that they would be destroyed by the heat of the part.

It has long been desired to carefully determine the stresses in parts which normally are heated in use to relatively high temperatures such as engine cylinder heads and exhaust systems. The direct determination of such stresses by electrical strain gauges, which provide a convenient and accurate means for such investigation, has hitherto been impossible.

Strain gauges, as usually constructed for measuring stresses in parts by direct application thereto, and of the type to which this invention relates, comprise resistance elements generally formed by a length of fine resistance wire preferably formed into a grid and secured to a backing of this material such as rice paper. This type of gauge is mounted with a suitable adhesive directly upon the part under test and therefore cannot be used on parts which become heated to temperatures in excess of the temperature at which the rice paper or other backing material used will char or the affixing cement will deteriorate.

The general object of the invention is to provide a construction of strain gauge of the type utilizing a fine resistance wire directly mounted upon a part to be tested which may be employed to measure the stresses in bodies heated to relatively high temperatures.

An object of the invention is to provide a simple and satisfactory strain gauge for use at elevated temperatures, which may be immovably secured to the part to be observed, by material which is substantially unaffected by the relatively high range of temperature for which the gauge is intended.

A further object of the invention is to provide a strain gauge for use at elevated temperatures, having the resistance wire from which the gauge is made immovably secured to the member to be tested by material serving both to secure the wire to the member and to electrically insulate it therefrom.

Another object of the invention is to provide means for protecting the junction of leads connecting the strain gauge to temperature recording instruments from the effects of the elevated temperatures to which the strain gauge is exposed.

Another object of the invention is to provide a novel method of securing high temperature strain gauges to metal surfaces which in use are heated to a relatively high temperature.

Other features and advantages of the present invention will be apparent from the following description taken in conjunction with the accompanying drawing, in which:

Figure 1 is a plan view showing a portion of a test part having a strain gauge of the present invention mounted thereon;

Figure 2 is a cross-sectional view taken along line 2—2 of Figure 1;

Figure 3 is a view similar to Figure 2 but showing the first step in the method of forming the strain gauge shown by Figures 1 and 2;

Figure 4 is a view similar to Figure 3 but showing a later step in forming the strain gauge of the present invention;

Figure 5 is a cross-sectional view illustrating a method of forming a modified form of the strain gauge of the present invention; and Figure 6 is a view similar to Figure 5 but showing a method of forming a further modified form of the strain gauge of the present invention.

The strain gauge of the present invention comprises, in the broadest aspects thereof, a length of resistance wire mounted to a metal part to be tested by a non-metallic, non-conductive material capable of being fused or cured at relatively high temperatures. The material used to mount the resistance wire is chosen with respect to the similarity of its coefficient of expansion with that of the metal to which the gauge is to be applied. The coefficient of expansion of the material used must be substantially that of the test part as otherwise the differential between the coefficients of expansion will cause the material to rupture or fracture and destroy the bond between the material and the test part.

The material should also have a melting or curing temperature in excess of the maximum temperature to which the metal test part will be heated in use. If the melting temperature of the material is less or substantially that of the temperature to which the test part can be expected to be heated the material will soften and allow the resistance wire to creep relative to the test part.

The materials used to mount the strain gauge of the present invention on the test part are of the types generally designated by the terms "ceramic" or "vitrics," which terms cover in their broadest sense materials capable of being fused or cured at elevated temperatures. Examples of such materials are vitreous enamels, vitreous cements, powdered glass compositions, certain clays, or similar frits or frit-like materials. For the purpose of clarity, the material used to mount the grid will be hereinafter designated as a frit.

Although various types of frit can be used in carrying out the invention of the present application, I have found that excellent results are obtained when materials of the following compositions, in terms of parts by weight, are used:

|  | A | B | C | D |
|---|---|---|---|---|
| Quartz | 21.0 | 29.0 | 20.5 | 22.0 |
| Feldspar | 26.0 | 22.0 | 27.0 | 31.0 |
| Borax | 35.0 | 30.0 | 30.0 | 21.0 |
| $Na_2CO_3$ | 7.5 | 5.0 | 10.0 | 3.5 |
| $NaNO_3$ | 4.0 | 4.5 | 5.0 | 3.5 |
| $MnO_2$ | 0.26 | 2.0 | 1.2 |  |
| CaF | 3.5 |  |  |  |
| $BaCO_3$ | 2.0 |  |  |  |
| $NiO_2$ | 0.26 |  |  |  |
| $CaO_2$ | 0.26 |  |  |  |
| Cryolite |  |  |  | 17.0 |
| $Ni_2O_3$ |  | 1.0 |  |  |
| $CO_2O_3$ |  | 0.4 | 0.5 |  |

In the form of the gauge of the present invention shown in Figures 1 and 2 the grid formed by the resistance wire 10 is insulatedly bonded to the test part 11 by a mass 12 of the frit. The gauge is formed, referring now to Figures 3 and 4, by depositing or dusting a layer or mass of the frit upon the surface of the test part 11. After the desired length of resistance wire has been formed into a grid, leads 13 are then connected to the grid and the connections made solid by a suitable high-temperature solder. The grid is then placed upon the layer of the frit, after which the same can be heated as by projecting a flame thereagainst to cause the frit to become molten. If desired, the layer or mass of frit may be first heated until the same is molten and the grid formed by the resistance wire then placed upon the molten layer of the frit. In either procedure, care should be taken to insure that the grid is separated from the test part by a layer of the frit as the grid must be insulated from the test part. After the grid is placed upon the mass of frit additional frit can be deposited over the grid and a flame again applied to melt the additional frit to cause the same to flow about and completely cover the grid.

Means must be provided to protect the soldered connections between the resistance wire 10 and the wires forming the leads 13 of the strain gauge. This means could comprise a layer of mica mounted between the soldered connection and the test part, although in the illustrated embodiment of the invention the protecting means comprises a ceramic sleeve 14 mounted in place about each soldered connection. The sleeves are supported by small clips 15 formed with pedal members 16 resting on the test part.

The gauge resulting from the method just described is shown in Figures 1 and 2, and it will be seen that the frit, after it has cooled and solidified, will not only bond the wire to the test part but also insulate the wire from the latter.

There is shown in Figure 5 a method of forming a modified form of the strain gauge of the present invention. In this method the grid is formed from a predetermined length of resistance wire 17 having a sheath of vitreous enamel 18. The sheath of enamel can be formed about the wire by any conventional process used to coat wire. In this embodiment of the method of the present invention, the enamel-covered resistance wire 17, after it has been formed into the grid and the leads 13 attached thereto, can be deposited on the test part and the enamel 18 then softened by an application of heat. The enamel should be heated to such a temperature that the same will flow to some extent to bond the grid to the test part.

If desired, a layer of frit 19 of the desired characteristics can be spread over the test part and then melted by an application of heat. In this embodiment of the method of the present invention, one step of which is illustrated by Figure 6, if the layer of frit has been melted before the enamel-covered wire 17 is placed upon the molten layer, heat may again be applied to melt the enamel sheath to provide a secure bond between the enamel and the layer of molten frit.

In an alternate method, a layer of frit 19 can be distributed over the desired area of the test part, the enamel-covered wire placed in position thereon, and heat then applied to simultaneously heat the enamel and frit to bring about the desired bond. To obviate stresses in the frit and enamel after the same have cooled, the coefficients of expansion of both the enamel and frit should be substantially that of the test part.

Although the resistance element of the gauge of the present invention has been illustrated and described as a predetermined length of resistance wire, the grid can be formed by a length of foil. The foil either can be formed by bending a flat strip of suitable metal into a grid or a grid can be cut or stripped from a flat sheet of the metal. Such a foil grid could also be formed by removing portions from a sheet of suitable metal and using the sheet itself as the resistance element.

It should now be seen that the present invention provides a strain gauge and a method of connecting the same to a test part which permits the determination of stresses in metallic members which in normal use are heated to relatively high temperatures.

The strain gauge of the present invention is particularly adapted for use in determining the stresses in exhaust stacks of various types of internal combustion engines. Such stacks are subject to excessive vibration and at normal engine speeds often run red-hot. As such stacks are heated to temperatures far in excess of the temperatures at which the paper backing of conventional strain gauges of this type would char or burn, the strain gauge of the present invention permits determination of stresses in such parts not heretofore possible.

Although the now preferred embodiments of the strain gauge of the present invention and the methods of forming the same have been illustrated and described herein, it is to be understood that the invention is not to be limited thereto, for it is susceptible to changes in form and detail within the scope of the appended claims.

I claim:

1. A strain gauge for the measurement of strain in a high temperature metallic part including: a length of electric resistance wire disposed on the outer surface of said metallic part; a ceramic mass bonding said wire to said surface; electrical leads joined to the resistance wire terminals by a metal fusible at a relatively low temperature and lying in adjacency to said metallic part; a jointure-socket member constructed, arranged, and organized to protect each of said joints from the extreme heat of said metallic part while concurrently enabling spacious access to said joints and comprising a discrete length of ceramic tubing disposed concentrically around and radially spaced from each of said soldered joints and establishing a heat insulating annular air gap between each of said joints and the adjacent surface of said ceramic tubing; and an annular supporting clip engaged around substantially the medial portion of each of said tubing members and having supporting feet resting on said metallic part a distance below said tubing sufficient to space said tubing far enough above the metallic part to minimize heat transfer to said tubing and joints from said high temperature metallic part; whereby the coaction of said elevated mounting and said air gap reduces the heat field around said fusible joints and maintains them integral and intact under substantially all operating conditions.

2. In a strain gauge for the measurement of strain in a high temperature metallic part, the gauge being of the type including a length of electric resistance wire diposed on the outer surface of the high temperature part with a ceramic mass bonding said wire to said surface and a pair of electrical leads for connecting the resistance wire terminals to strain indicating instruments: a soldered joint between said leads and said terminals; a jointure socket for dually protecting each of the soldered joints from the extreme heat of said metallic part and positively maintaining the soldered joints substantially constantly at a non-fusing temperature while enabling spacious access to said joints, and comprising a separate individual length of ceramic tubing, constituting a nipple, embedded discretely in said ceramic mass and disposed concentrically around each of said soldered joints, said nipple being open at its outer end to relatively cool atmospheric air and being tapered at the opposite end into union with said resistance wire and having an average cylindrical diameter greater than that of said soldered joint, thereby defining a heat insulating annular air space between the inner surface of each of said nipples and each of said joints and establishing a joint-cooling air inflow path substantially occupying the lower cylindrical half of each tube and a heat removing hot air outflow path substantially occupying the upper cylindrical half of each tube; and an annular supporting clip engaged with each nipple and having supporting feet resting on said metallic test part a distance below each nipple sufficient to position each of said joints far enough above the ceramic mass and the metallic part to minimize heat transfer from said mass and said metallic part to said soldered joints; whereby to maintain the connection between said leads and said resistance-wire terminals intact and integral at substantially all operating temperatures of said metallic part.

3. The method of forming a strain gauge adapted for use on a high temperature metallic test part, comprising: depositing on the outer surface of said metallic test part a layer of powdered ceramic constituting a frit; fusing said powder in situ into substantial union with said metallic part; placing a length of electric resistance wire on the fused layer of frit while the latter is plastic; depositing on and around said wire and in contact with said plastic frit, another layer of powdered ceramic constituting a frit similar to the first said frit; fusing said powder in situ to form around said wire a layer of thermally and electrically non-conductive material melting at a temperature higher than that ever attained by said metallic test part; allowing said material to cool with said wire spaced from said metallic part thereby to bond said wire to said part; and thereafter attaching lead wires to the terminals of said electric resistance wire; whereby to form an electric resistance wire strain gauge in which the wire is invariably spaced a constant predetermined distance outwardly of said metallic part.

4. The method of forming a strain gauge for use with parts attaining relatively high temperatures in use, comprising: forming a predetermined length of high resistance wire; soldering electrical leads to the terminals of said resistance wire; placing about each of the soldered joints a separate individual ceramic sleeve having an inner diameter considerably larger than the outer diameter of each of said soldered joints; fixing to each sleeve a clip adapted to support the sleeve about a selected portion of the metallic test portion; depositing on the surface of said metallic test part a layer of powdered ceramic constituting a frit having a higher melting point than the maximum temperature attained by said metallic part; fusing said powder in situ into union with said metallic part; placing said wire tubes and clips on the fused layer while the latter is still plastic; depositing over and around the wire tubes and clips a layer of powdered ceramic constituting a frit substantially identical with the first said frit; fusing said powder in situ while said wire tubes and clips are held spaced outwardly from said metallic part and allowing the plastic frit to flow around and about said wire and about the lower portions of said clips; and thereafter allowing said molten mass of material to cool and harden.

WILLIAM D. VAN DYKE.

REFERENCES CITED

The following references are of record in the file of this patent:

UNITED STATES PATENTS

| Number | Name | Date |
| --- | --- | --- |
| 1,962,617 | Rosenberg | June 12, 1934 |
| 2,075,906 | Maude | Apr. 6, 1937 |
| 2,154,261 | Brandt | Apr. 11, 1939 |
| 2,280,257 | Pearson | Apr. 21, 1942 |
| 2,327,935 | Simmons I | Aug. 24, 1943 |
| 2,344,648 | Simmons II | Mar. 21, 1944 |
| 2,367,211 | Greenfield | Jan. 16, 1945 |